United States Patent [19]

Nguti

[11] Patent Number: 4,979,430
[45] Date of Patent: Dec. 25, 1990

[54] PASSENGER COOLING DEVICE

[76] Inventor: Tallam I. Nguti, 619 Elmwood Ter., Rochester, N.Y. 14624

[21] Appl. No.: 448,877

[22] Filed: Dec. 12, 1989

Related U.S. Application Data

[62] Division of Ser. No. 234,578, Aug. 22, 1988, Pat. No. 4,903,582.

[51] Int. Cl.⁵ .............................................. B60H 1/30
[52] U.S. Cl. ..................................................... 98/2.12
[58] Field of Search ............... D3/1, 4; 98/2.12, 2.13; 116/35 R, 41, 42; 416/70 A, 70 R, 71

[56] References Cited

U.S. PATENT DOCUMENTS

| D. 110,539 | 7/1938 | Fingerhut | D3/4 |
|---|---|---|---|
| D. 137,304 | 2/1944 | Donahue | D3/1 |
| 1,126,797 | 2/1915 | Lichter | 416/70 A |
| 2,019,906 | 11/1935 | James | 416/70 A |
| 2,594,682 | 4/1952 | Ritch | 98/2.12 |
| 2,658,793 | 11/1953 | Sinclair | 98/2.12 X |
| 4,033,245 | 7/1977 | DeRees | 98/2.12 |
| 4,085,665 | 4/1978 | Paxton | 98/2.12 |
| 4,423,668 | 1/1984 | Long | 98/2.12 |
| 4,493,663 | 1/1985 | Richmond | 416/70 R X |

OTHER PUBLICATIONS

*Standard Catalog of American Cars*, p. 8.

*Primary Examiner*—Harold Joyce

[57] ABSTRACT

On hot and humid days, an air deflecting device suitable for placement in an open passenger window of a vehicle such as a car, a train, a bus or the like, and immediately adjacent a selected area of the body such as the chest, neck, face or head of a passenger by such window, is movable within such window for deflecting an outside breeze in such a manner that the deflected breeze directly impacts and cools various such selected areas of the body of the passenger within such vehicle.

8 Claims, 4 Drawing Sheets

PASSENGER COOLING DEVICE

This a divisional of application Ser. No. 234,578, filed Aug. 22, 1988, now U.S. Pat. No. 4,903,582.

BACKGROUND OF THE INVENTION

The present invention relates to devices for cooling a person in a hot, humid and uncomfortable environment, and more particularly to an air deflecting device that can be placed in an open window of a hot, humid and uncomfortable passenger compartment of a vehicle such as a car, a train, a bus or the like, for cooling the compartment and the person, by deflecting outside air into the compartment, and into direct impact against various and selected areas of the body of the person.

On such hot and humid days, persons, especially passengers in unairconditioned compartments in vehicles such as cars, trains, buses and the like, generally feel hot, sweaty and uncomfortable. In fact, such an unairconditioned vehicle compartment, when it is directly being heated by radiation from the sun, usually behaves much like an oven. As a result, the temperature inside such a compartment, on such a hot and humid day, may actually be higher than the temperature of the outside air.

This difference between the temperature inside and outside such a compartment can of course be reduced by opening the passenger compartment windows or other ventilation windows in order to help exchange inside for outside air. Doing so will work, provided there is a cross wind or provided the vehicle is moving at a high rate of speed. It will work with a cross wind because cross winds, that is, winds blowing at or close to 90 degrees with the direction of movement of the vehicle, will blow through the open window and into the compartment. It will also work at high speeds because at such speeds, for example, speeds over 35 miles per hour, the flow of air along the vehicle compartment window in the-front-to-back direction will usually be turbulent enough to cause some of the air to effectively flow crosswise into the vehicle compartment.

At lower speeds, however, such as speeds below 31 miles per hour, the flow of air along the vehicle compartment window in the-front-to-back direction is essentially laminar, as opposed to turbulent. As such, the air will tend to move by the window and with the vehicle, but not into the vehicle. Merely opening the passenger compartment windows at such low speeds may therefore not be enough to cause sufficient exchange of the air within the passenger compartment so as to equalize the inside and outside temperatures around the passenger compartment.

Yet, speed limits on most residential area roads are within this low range of speeds at which the air flow is likely to be laminar. In addition, the higher speeds at which air flow is turbulent, are either unsafe, or are prohibited on such residential roads. There is therefore a need, especially within the low or residential area speed range, to cause air, in laminar flow along the open passenger window, to flow crosswise into the passenger compartment in an attempt to equalize the inside and outside temperatures around the compartment. However, merely equalizing the inside and outside temperatures may not be enough to provide the cooling and comfort being sought by a passenger within such compartment, since on hot and humid days, the outside air itself is hot, humid and uncomfortable. Therefore, there is an even greater need at such low speeds at which air flow about a moving vehicle is laminar, to find a way to cause an appreciably strong breeze to blow, not just into the compartment, but directly and strongly into cooling and comforting impact against various and selected areas of the body of a passenger within such a hot, humid and uncomfortable vehicle compartment.

SUMMARY OF THE INVENTION

Therefore, it is an object of the present invention to provide a method and apparatus for cooling a passenger compartment of a vehicle such as a car, a train, a bus or the like, and for cooling a passenger within such compartment.

It is a further object of the present invention to provide a method and apparatus for deflecting air, moving outside an open passenger window of a vehicle such as a car, a train, a bus or the like, such that the deflected air directly impacts against and cools, as well as, comforts various and selected areas of the body of a passenger within such vehicle.

In accordance with the present invention, a device is provided that is suitable for placement in an open passenger window of such a vehicle to deflect air moving outside such open window into direct and cooling impact with the chest, neck, face and head, for examples, of a passenger seated within such vehicle. This device of the present invention includes a plate member that has a windward surface that can deflect a breeze moving against it, a leeward surface, a front portion including a front edge, a rear portion including a rear edge, and first and second side edges. When placed edgewise on its side in the open passenger window of a vehicle such as a car, a train, a bus or the like, the plate member is at an oblique angle with its rear edge pointing to, and immediately adjacent a selected area of the body to be cooled, and its front edge projecting out of such window. Placed within the window as such, the plate member can be moved at least up and down, and forwards and backwards to intercept, deflect and vary the amount and direction of, breeze necessary to impact and cool various such selected areas of the body of a passenger within such vehicle.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Figure 1:
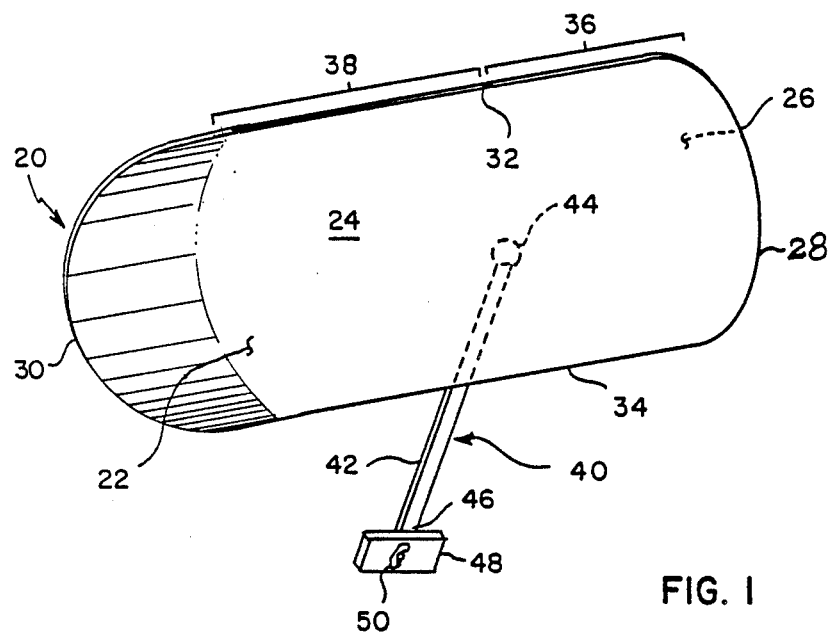
FIG. 1 is a plan view of the windward surface of a first embodiment of the device of the present invention.

Referring now to the drawings, like reference numerals have been used in the several views and illustrations for like elements and like features. FIG. 1 shows a first embodiment of the device of the present invention generally designated as 20, and FIG. 2 illustrates a preferred manner of using this first embodiment and the other embodiments of the device of the present invention.

The device 20, as shown in the first embodiment of FIG. 1, includes a plate member 22 that has a windward surface 24. The surface 24 which may be concave, is noncomplaint and impermeable to air so as to be effective in deflecting an airstream, such as a breeze, moving against it. The plate member 22 further has a leeward surface 26, a front edge 28, a rear edge 30, and first and second side edges 32, 34. In addition, the plate member 22 can be viewed as having a front portion 36 adjoining the front edge 28, and a rear portion 38 adjoining the rear edge 30.

The device 20 further includes attaching means 40. Attaching means 40 in this embodiment consists of a flexible gooseneck type connector 42. The connector 42 is attached at its first end 44, so that it can swivel with and be locked to, the leeward surface 26 of the plate member 22, and at its second end 46 to a bracket 48. The bracket 48 can be appropriately fastened temporarily or permanently, for example, to a part of a passenger window of a vehicle or of the vehicle itself, with a fastener such as a screw 50. The bracket 48 is appropriately fastened, when the connector 42 can be moved variably so as to locate the plate member 22 in position in a window of a vehicle for deflecting a breeze into cooling impact with a person in such vehicle.

Figure 2:
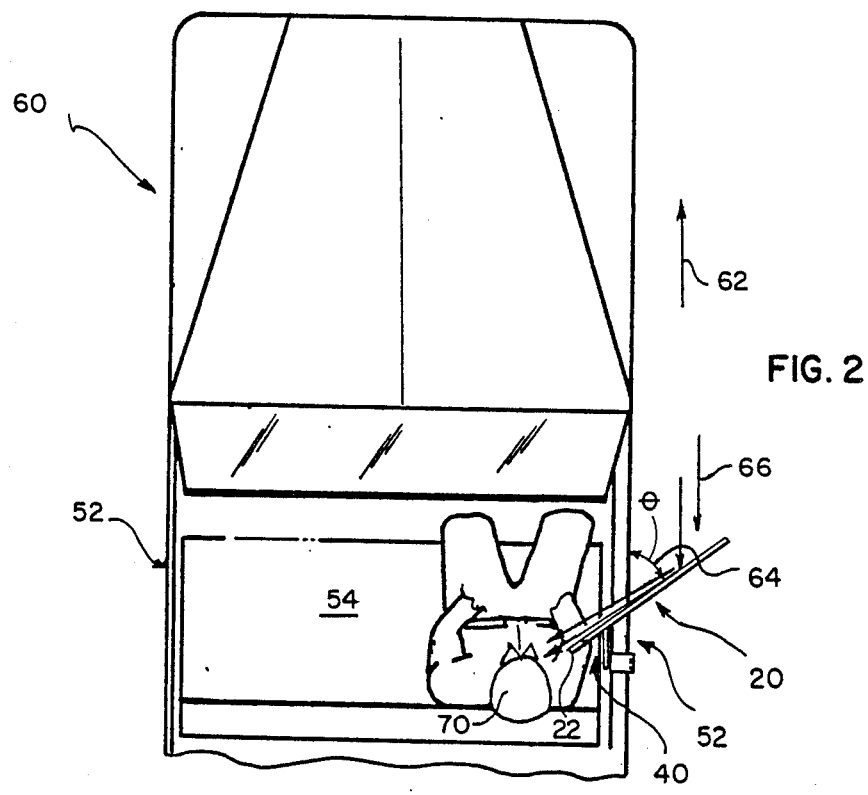
FIG. 2 is an illustration of the device of the present invention, within an open passenger window of a moving vehicle, deflecting a breeze into such vehicle for cooling a person seated therein.

Referring now to FIG. 2, the device 20 is shown with the plate member 22 placed edgewise, in a preferred manner, in an open passenger window 52 to a passenger compartment 54 of a vehicle 60. The bracket 48 can be permanently or temporarily fastened to a part of the window 52 or vehicle 60 such that the connector 42 can be moved to place the plate member 22 edgewise on its side and in such preferred manner in the open window 52. The vehicle 60 can be a car, a train, a bus or the like. Vehicle 60 as shown in FIG. 2, is moving at a speed and in the direction indicated by the arrow 62. The device 20 is placed in the window 52 at an oblique angle 64, and such that the windward surface 24 points to the front of the vehicle, and such that the rear edge 30 points to and is immediately adjacent a selected area of the body to be cooled, and the front edge 28 together with the front portion 36, project out of the window 52 to intercept and deflect a breeze 66 into the compartment 54.

The breeze 66 normally is moving in a direction opposite to that of the vehicle 60. In fact, when there is ordinarily no breeze or wind blowing naturally, the breeze 66 may be created simply by the movement, in the direction 62, of the vehicle 60 relative to the surrounding air. On striking against the windward surface 24 of the device 20, the breeze 66 is deflected into the compartment 54 where it is useful in cooling the compartment, and especially in cooling and comforting a passenger 70 positioned within such compartment.

As attached by the bracket 48 and the flexible connector 42 or by alternative embodiments of the attaching means 40 (to be disclosed and described below in connection with second and third embodiments of the device 20), the device 20, as located in the window 52, can be moved pivotally, up and down, in and out, and forwards and backwards, so as to vary the amount and direction of the breeze 66 being deflected into the compartment 54. More particularly, the device 20 is moved as described above, so as to deflect the breeze 66 into direct and cooling impact with various and selected areas of the body of the passenger 70. Such various and selected areas typically may include the passenger's chest, neck, face and head.

The general effect of the breeze 66 being deflected into the compartment 54 is to cool the compartment and its passenger. This is because on hot and humid days when the compartment 54 is behaving more like and oven, the outside air that forms the breeze 66 is actually cooler than the air inside the compartment 54. The breeze 66 on being deflected into the compartment, cools the compartment by causing an air exchange that ends up making it just as cool inside the compartment as it is outside such compartment.

More specifically, the effect of the breeze 66 being deflected into direct impact with areas of the body of the passenger 70, is to produce a cooling and comforting effect that far exceeds any cooling and comforting effect from merely exchanging the air in the compartment 54. Such greater cooling and comforting are achieved due to the direct impact of the breeze 66 with areas of the passenger's body. The breeze 66 on directly impacting or striking an area of the body of the passenger, greatly increases the rate of evaporation of sweat and other moisture from the body. It is of course known that for a liquid or moisture to evaporate, it must first undergo a phase change into the vapor state. In addition, the thermal law of fluids teaches that at atmospheric pressure fluids absorb heat when changing into their vapor state. Accordingly, in the course of the increased evaporation caused by the deflected breeze 66 directly striking areas of the passenger's body, the sweat and other moisture on the body of the passenger 70 will absorb heat from the passenger's body thereby greatly cooling the body.

Besides this great cooling effect on the body, the deflected breeze 66 also adds to the feeling of comfort because it has a massaging and caressing effect on the skin of the body of the passenger 70. As a consequence, a passenger 70 positioned in a hot, humid and uncomfortable passenger compartment 54 of a vehicle 60, on a hot and humid day, can be made to feel substantially cooler and more comfortable by the deflected breeze 66. In addition, the deflected breeze 66, being fresh outside air, in some cases, may actually be more preferable than air that is recirculated within the vehicle compartment 54.

Referring now to FIGS. 3 to 6, a second embodiment of the device 20 is illustrated. This second embodiment which is especially adapted for attachment to a person's hand, also includes a platemember 22. As in the first embodiment, the plate member 22 of this second embodiment has an equivalent windward surface 24, as well as, a leeward surface 26, a front edge 28, a rear edge 30, and first and second side edges 32, 34. Plate member 22 also has a front portion 36 adjoining the front edge 28, and a rear portion 38 adjoining the rear edge 30. This second embodiment can also be placed edgewise in the open passenger window 52 and moved, in the same manner as described above (FIG. 2), to intercept and deflect the breeze 66 into direct and cooling impact with various and selected areas of the body of the passenger 70.

For manual control and safety reasons, the plate member 22 of this second embodiment includes a free-thumb cutout curvature 72 on one of the side edges 32, 34 within the front portion 36 of the plate 22. The particular side edge 32 or 34 selected, depends on whether the particular unit of the device 20 is being adapted for left hand or right hand use. The particular side edge is chosen such that when the device 20 is properly attached to the user's hand (as will be described below) the windward surface 24 will face and operate to deflect the breeze 66 (FIG.2).

Figure 3:
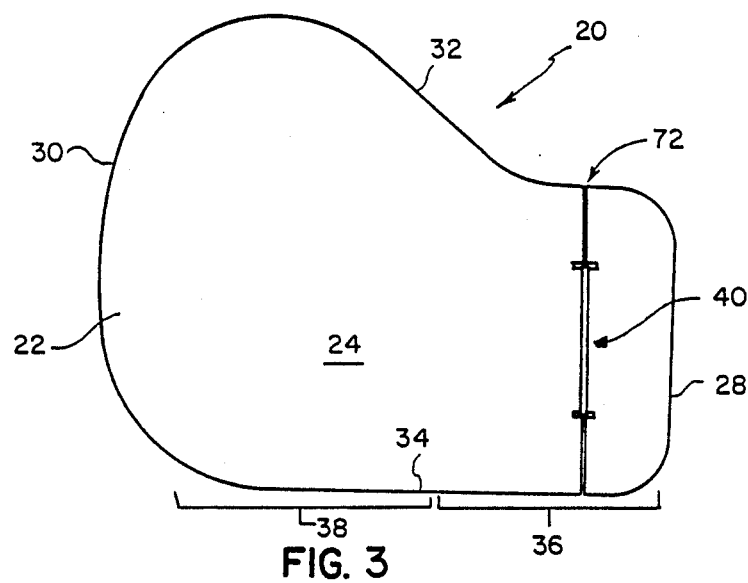
FIG. 3 is a plan view of the windward surface of a second embodiment of the device of the present invention.
Figure 4:
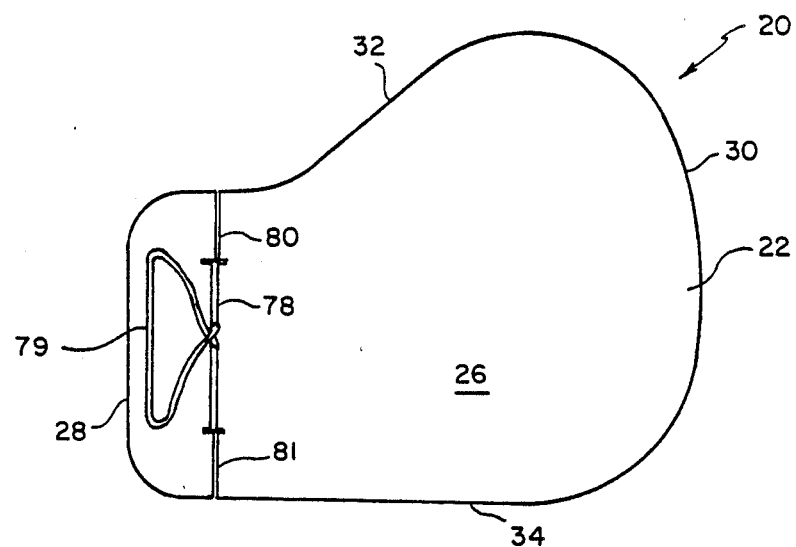
FIG. 4 is a plan view of the leeward surface of the second embodiment.
Figure 5:
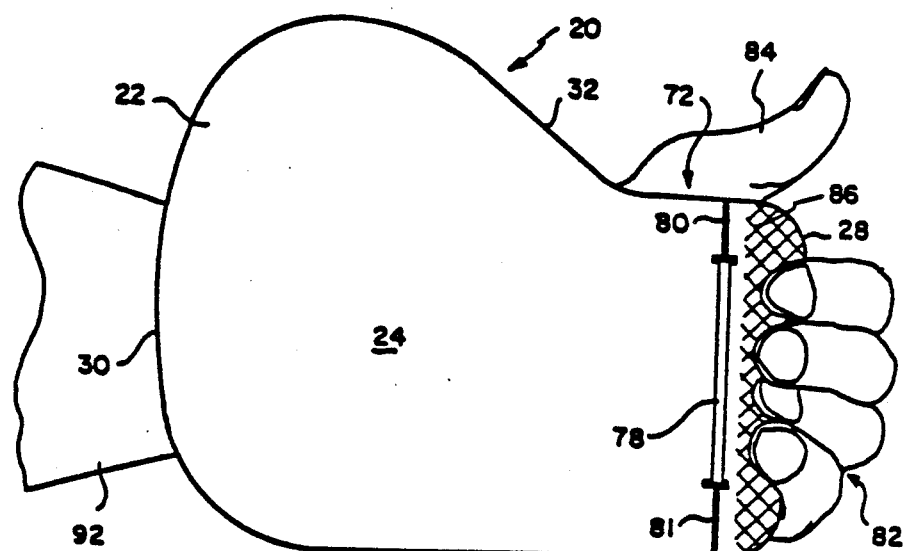
FIG. 5 is an illustration of how the second embodiment may be held in the hand of a user.
Figure 6:
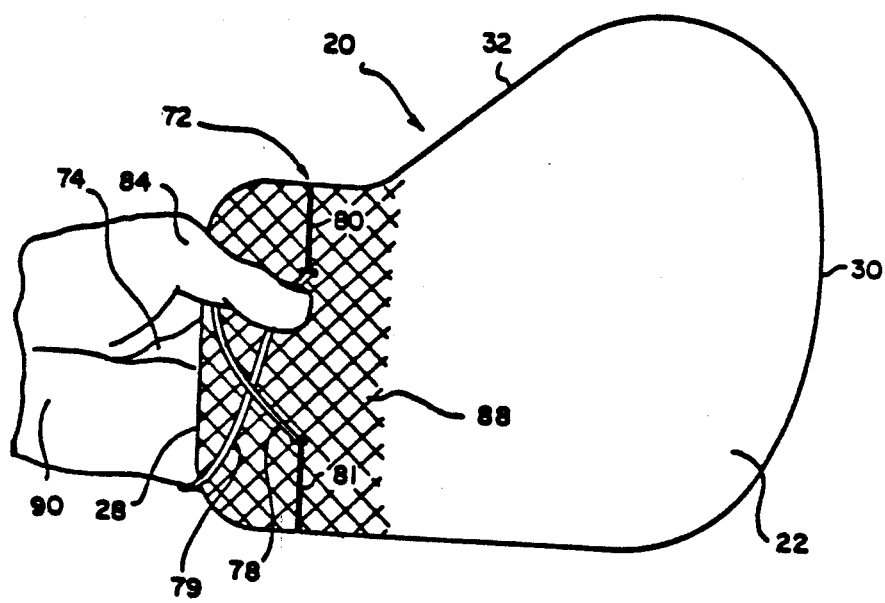
FIG. 6 is an illustration of the second embodiment flipped 180 degrees for use as an ordinary hand fan.

Like the first embodiment, this second embodiment also includes an attaching means 40. The attaching means 40 of this second embodiment, however, is adapted for attachment to the palm 74 of the hand 76 (FIGS. 3 to 6) of a user such as the passenger 70 (FIG.2). As illustrated in FIGS. 5 and 6, this attaching means 40 further includes a first attachment member 78, and a second attachment member 79. The first attachment member 78 is preferably connected to the leeward surFace 26 by suitable means, or it may be fitted as illustrated in FIG. 3, through T-shaped slits 80, 81, cut respectively into the first and second side edges 32, 34 within the front portion 36 of plate member 22. The second attachment member 79 is connected to the first attachment member 78, and is adapted to fit around the palm 74 of the hand of the user.

To attach this second embodiment to a user's hand 76, the second attachment member 79 is slipped over the fingers 82 of the hand. The attachment member 79 is then brought down to rest between the thumb 84 and the fingers 82, and around the palm 74 such that the leeward surface 26 faces into the palm 74, and the windward surface 24 faces away (FIG. 5). When attached to the hand in this manner, the front edge 28 and an area 86 which is part of the front portion 36 on the windward surface 24, will lie at the base of the fingers 82, and the thumb 84 will be adjacent, and exposed by the cutout curvature 72.

In order to further grip and obtain greater control over the plate member 22 of this second embodiment, the fingers 82 may be bent at the middle joints over the front edge 28 so that the tips of the fingers can rest and press against a part of the area 86. Gripped as such, a part of an area 88 that forms the leeward surface of the front portion 36, should contact and rest against the heel 90 of the palm 74 of the hand of the user, and the entire rear portion 38 should be movable freely towards and away from the thumb 84 in a pivoting motion centered within the grip of the fingers 82. The entire device 20 can also be moved by moving the forearm 92, and wrist, of the user within the open window 52 (FIG.2).

Referring now to FIGS. 5 and 6, the area 86 which borders the front edge 28, and part of which is contacted by the fingers 82, is padded, for example, with felt for comfort and for absorbing sweat and perspiration from the fingers. For these same reasons, the entire area 88 which forms the leeward surface to the front portion 36, and part of which contacts and rests on the heel 90 of the palm 74, is also similarly padded, for example, with felt.

FIG. 6, in addition, illustrates another feature of this second embodiment of the device 20. As attached to the palm 74 with attachment members 78, 79, the entire plate member 22 can be flipped about 180 degrees on the front edge 28 such that the front portion 36 can be grasp between the thumb 84 on the leeward surface, and the fingers 82 on the windward surface. Flipped and grasped in this manner, the rear Portion 38 can be used to move still air when moved back and forth with the wrist of the hand, effectively making the device 20 an ordinary hand fan. A passenger 70, initially utilizing this particular embodiment of the device 20 for deflecting the breeze 66 (FIG.2), can therefore continue to use it as an ordinary fan, if and, when the vehicle 60 comes to a stop eliminating or substantially reducing the breeze 66.

Figure 7:
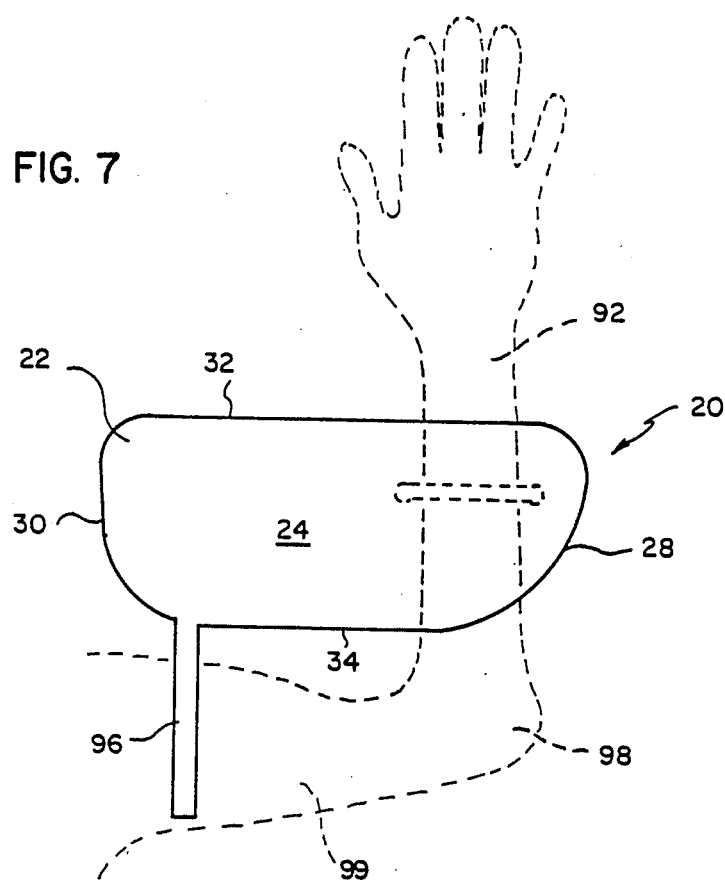
FIG. 7 is a plan view of the windward surface of a third embodiment of the present invention.
Figure 8:
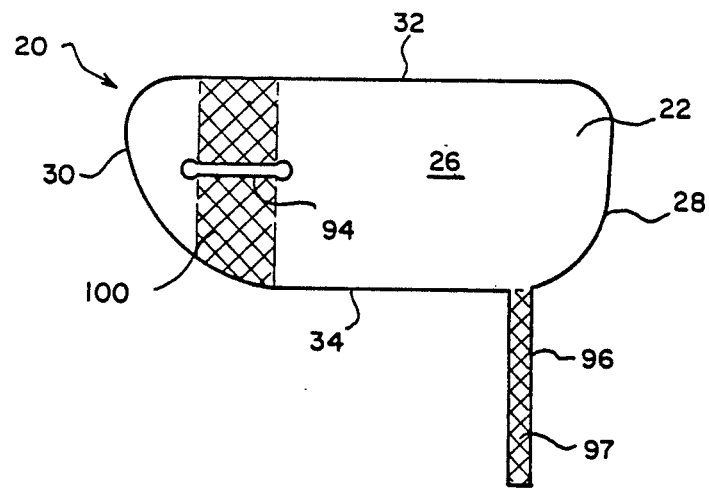
FIG. 8 is a plan view of the leeward surface of the third embodiment.

FIGS. 7 and 8 illustrate a third embodiment of the device 20 of the present invention. Like the first two embodiments, the third embodiment also includes the plate member 22 with all its features, as well as an attaching means 40. The attaching means to this particular embodiment is however slightly different in that it includes a forearm strap 94 and an arrest member 96. The forearm strap 94 is connected to the leeward surface 26 within the front portion 36 and close to the front edge 28. The arrest member 96, on the other hand, is a narrow, elongate and rigid strip projecting from the second side edge 34 within the rear portion 38, and having a leeward surface 97.

This third embodiment is particularly suitable for attachment to the forearm 92 of a person as illustrated in FIG. 7. Attachment to the forearm 92 is achieved by slipping the forearm 92 through the strap 94 and then bringing the plate member 22 down towards the elbow 98. With the elbow 98 bent so that the forearm 92 is upright as in FIG. 7, the plate member 22 should be brought as close as possible to the upperarm 99, and such that the arrest member 96 projects into the armpit area while resting against on the inside of the upperarm. When attached in this manner, the forearm 92 will be in contact with a narrow area 100 that stretches the entire width of the plate member 22 and under the forearm strap 94. For comfort and perspiration absorption, the narrow area 100, is padded. For safety reasons, the exposed tip of the arrest member, as well as, all corners formed by the edges of the plate member, are rounded and blunted.

Whether using the first, second or third embodiment of the device 20 of the present invention, a passenger 70 (FIG. 2), positioned by an open passenger window 52 in a hot, humid and uncomfortable passenger compartment 54 of a moving vehicle 60, can deflect a breeze 66 into direct and cooling impact with various and selected areas of his or her body. With the first embodiment, the bracket 48 can be fastened to a part of the window 52 or to a part of the vehicle 60, and the flexible gooseneck connector moved so as to position the plate member in the manner described above under FIG. 2. With the second embodiment, the plate member as described above, is effectively manipulated with the thumb, fingers and wrist for movement in such window. With the third embodiment, the plate member can be moved effectively with the bent elbow 98 placed in the open window, and the plate member projecting out of the window as called for in FIG. 2.

Although the above detailed description has been made with particular reFerence to preferred embodiments, it will be understood that variations and modifications can be effected within the spirit and scoPe of the present invention.

What is claimed is:

1. A device for directly cooling and comforting a user of the device by an open window in a moving vehicle, the device including:

(a) a plate member having (i) a windward surface, (ii) a leeward surface, (iii) a front portion including a front edge, (iv) a rear portion including a rear edge, and (v) first and second side edges; and (b) means for attaching said plate member to the forearm part of the arm of the user for location, movement and manipulation, as attached, with such arm, in the open window such that (i) said plate member is located edgewise within the open window and (ii) said front edge projects out of the open window when said rear edge is pointing to, and is immediately adjacent to, a selected area of the body of the user being cooled and comforted, and such that said plate member, as attached, is movable, with such arm pivotally, up and down, in and out, and forwards and backwards within the open window for deflecting a breeze generated by the moving vehicle, as well as, for varying the amount and direction of the deflected breeze in such a manner that the deflected breeze directly impacts, cools and comforts various such selected areas of the body of the user.

2. The invention as set forth in claim 1 wherein said second side edge further includes an arrest member projecting therefrom within said rear portion of said plate member.

3. The invention as set forth in claim 1 wherein said attaching means includes a strap secured to the leeward surface of the plate member and adapted to fit over the forearm of a person such that an area of the leeward surface is in contact with the forearm.

4. The invention as set forth in claim 3 wherein said forearm strap is made of elastic material.

5. The invention as set forth in claim 3 wherein said area in contact with the forearm is padded for comfort and dryness.

6. An air deflector device for deflecting air into the passenger compartment of a moving vehicle, the device including a deflector plate operably movable within an open window of such compartment, and means for attaching said deflector plate to a part of the arm of a user such that said plate can be located and moved with such arm within the open window for deflecting the air into such compartment.

7. A method for directly air cooling and comforting various areas of the body of a person positioned by an open window of a vehicle on a hot humid and uncomfortable day, the method comprising the steps of:

(a) generating a breeze, along the outside of such window and generally parallel thereto by driving, such vehicle to move in a given direction;

(b) attaching a plate member to a part of the arm of such person, said plate member including means for attaching it to said part of the person's arm; and (c) locating said plate member, attached to said part of the person's arm, in such open window for deflecting said generated breeze into said vehicle.

8. The method of claim 7 further including the step of moving said plate member pivotally, up and down, in and out, and forwards and backwards within such open window by moving said part of the person's arm appropriately so as to deflect said generated breeze into contact with different areas of the body being cooled and comforted.

* * * * *